United States Patent Office 2,923,572
Patented Feb. 2, 1960

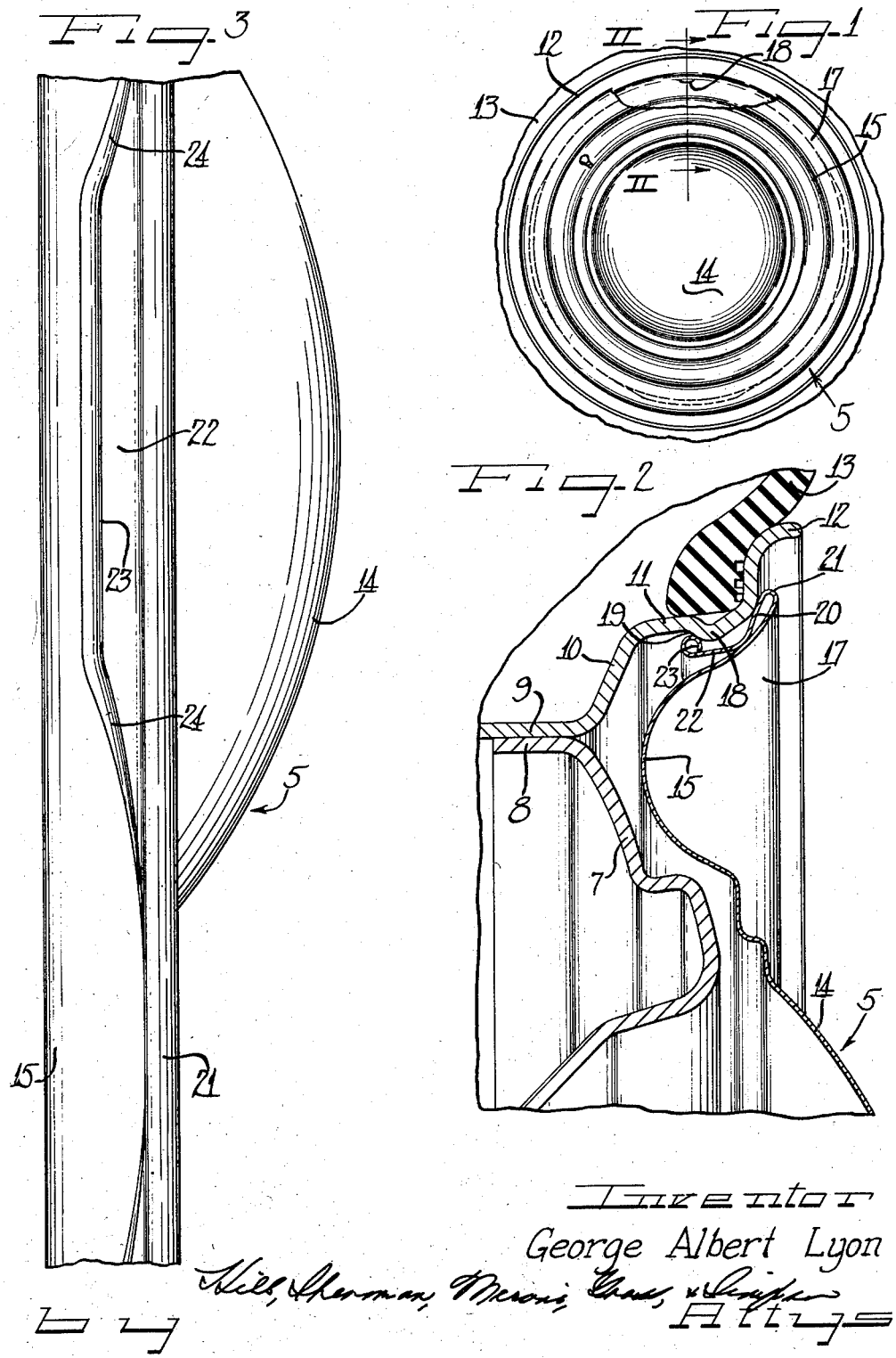

2,923,572

WHEEL COVER

George Albert Lyon, Detroit, Mich.

Application June 21, 1955, Serial No. 516,822

1 Claim. (Cl. 301—37)

The present invention relates to improvements in wheel structures and more particularly concerns the ornamental and protective covering of the outer sides of vehicle wheels.

An important object of the present invention is to provide an improved, simplified, wheel structure wherein a cover is self retainingly engageable with a vehicle wheel in a novel manner.

Another object of the invention is to provide an improved wheel cover having novel cover retaining means thereon engageable with retaining projection means on a wheel.

A further object of the invention is to provide in a wheel cover improved retaining finger means for engagement with a part of a wheel over which the cover may be disposed.

Other objects, features and advantages of the present invention will be readily apparent from the following detailed description of a preferred embodiment thereof taken in conjunction with the accompanying drawing in which:

Figure 1 is a side elevational view of a wheel structure embodying features of the invention and with a part broken away for clarity of illustration;

Figure 2 is a fragmentary radial sectional view taken substantially on the line 2—2 of Figure 1; and Figure 3 is a fragmentary side elevational view of the cover showing the novel retaining finger structure thereof.

A cover 5 according to the present invention is adapted to be applied to the outer side of a vehicle wheel such as automobile wheel having a disk spider body 7 provided with an axial attachment flange 8 secured in suitable fashion to a base flange 9 of a tire rim having extending generally radially outwardly and sloping axially outwardly a side flange 10 merging with an intermediate generally axially outwardly and radially outwardly sloping flange 11 which leads into a generally radially outwardly and then axially outwardly turned terminal flange 12.

The flanges of the tire rim are constructed and arranged for supporting a pneumatic tire 13 which may be of the tubeless type or of the tube and tire combination.

According to the present invention the wheel cover 5 is of a simple, economical construction provided with self retaining means for snap-on pry-off engagement with and over the outer side of the wheel. To this end, the cover 5 comprises a sheet metal plate or disk which is preferably of a material such as stainless steel or brass or the like that is readily formed to shape by stamping or drawing and cold working. Herein the cover 5 comprises a central crown portion 14 adapted to overlie the central portion of the wheel body 7 and leading radially outwardly into a dished annular portion 15 adapted to overlie the juncture portion between the wheel body and tire rim. At its radially outer side the dished juncture portion 15 has a generally radially and axially outwardly extending marginal cover portion 17 arranged to overlie the tire rim.

Cover retaining means are provided behind the outer marginal cover portion 17 for engagement with cover retaining projections 18 in the form of pressed in bumps that slope from juncture with the terminal flange 12 and have undercut generally radially and axially inwardly facing retaining shoulders 19. There may be as many of the retaining bumps 18 as desired, such as four in the present instance. For retaining snap-on pry-off engagement with the bumps 18, the outer extremity of the cover portion 17 is provided with an underturned generally radially and axially inwardly extending flange 20 that may be provided integrally in one piece therewith and joins the extremity of the cover on a turned bead like finishing edge 21. By preference the radially inner portion of the flange 20 bottoms against the back of the cover portion 17 and extends radially inwardly beyond the inner diameter of the intermediate flange 11.

Extending generally axially inwardly from the inner edge of the radial underturned flange 20 and projecting divergently relative to the axially inner area of the cover portion 17 is a series of retaining fingers 22 which are disposed in the space between the cover portion 17 and the intermediate flange 11 so as to enable resilient radial deflectionable movement of the finger extensions. Each of the finger extensions has a turned terminal 23 projecting radially outwardly and in the present instance preferably in the form of a turned bead that extends to a radial diameter greater than the diameter about the tips of the retaining bumps 18, and also extends to an axially inward position spaced from the underturned flange 20 preferably slightly less than the space from the axially inner extremity of the retaining shoulders 19 of the bumps relative to the juncture shoulder of the intermediate flange 11 with the terminal flange 12 and against which the underturned flange bottoms in assembly with the wheel. As a result, when the cover is applied to the outerside of the wheel, the retaining fingers 22, which as seen in Fig. 1, are equal in number to and aligned with the bumps 18, are pressed inwardly the terminals 23 will cam over the bumps 18 and snap therebehind against the retaining shoulders 19 under resilient camming tension to draw the cover tightly axially inwardly against the tire rim. In this position the cover is held in spaced relation to the wheel body 7.

In order to afford substantial resilient stiffness for the fingers 22 which, as best seen in Figs. 1 and 3, are individually formed as extensions from the flange 20, the finger extensions are of substantial width, are arcuately curved circumferentially of the cover, are relatively short in an axial direction, and, more importantly, have the retaining terminal stiffening and reinforcing beads 23 thereof merging continuously with and into tapering sides of the fingers substantially to merger of such sides with the flange 20, substantially as shown at 24 in Fig. 3. Hence, the retaining fingers are of substantial resilient stiffness, will resist radially inward deflection in snapping over the bumps 18, and after having snapped therebehind will, due to the strong resilient radially outward reaction developed in the resilient fingers, effect a strong gripping tensioned hold upon the retaining bump shoulders 19. This will strongly resist axial displacement of the cover from the wheel, but will enable displacement intentionally by prying the same free from the wheel by insertion of a pry-off tool behind the outer reinforced margin of the cover and levering thereagainst and against the terminal flange 12 of the tire rim.

It will be appreciated that by virtue of the instant construction of the cover, a very economical cover is provided since the material used in the cover is at a minimum. The individual retaining fingers 22 are derived from corners of a square blank and the edge of the flange 20 intermediate the several retaining fingers can be the side edges of the blank. In mass production the saving of material thus effected over a continuous beaded annular axial flange arrangement is thus quite appreciable. This enables the cover to be produced and sold at low cost.

It will be understood that modifications and variations may be effected without departing from the scope of the novel concepts of the present invention.

I claim as my invention:

In a wheel structure including a generally radially facing annular flange portion provided with a series of circumferentially spaced generally radially projecting retaining bumps, a circular cover member having a portion thereof for concealingly overlying said annular flange portion, said cover portion having a generally radially extending underturned flange provided with individual axially inwardly extending retaining fingers of substantial width and circumferentially arcuate form having sides tapering to juncture with the terminus of said cover flange, there being the same number of fingers as cover retaining bumps, said fingers lying on a diameter which is at variance with the diameter about the bumps so as to be freely telescopically received in confronting relation to said bumps, each of said fingers having on its axially inner extremity a turned stiffening terminal reinforcing structure projecting radially toward said wheel flange portion and retainingly engaging the bumps in press-on, pry-off relation as enabled by resilience of the fingers, said turned terminal reinforcing structure extending integrally from the axially inner ends of the fingers along the edge of each of the tapering sides of each of the fingers substantially to juncture of the tapering sides with the underturned flange for thereby imparting substantial resilient stiffness to the fingers, said turned terminal reinforcing structure on the tapering sides gradually diminishing from the axially inner ends of the fingers to the vicinity of merger of the tapering sides with the underturned flange.

References Cited in the file of this patent

UNITED STATES PATENTS

| | | |
|---|---|---|
| 2,607,633 | Lyon | Aug. 19, 1952 |
| 2,624,635 | Lyon | Jan. 6, 1953 |
| 2,640,730 | Lyon | June 2, 1953 |
| 2,671,695 | Lyon | Mar. 9, 1954 |